United States Patent
Poore et al.

(10) Patent No.: US 6,202,933 B1
(45) Date of Patent: Mar. 20, 2001

(54) TRANSACTION CARD AND METHODS AND APPARATUS THEREFOR

(75) Inventors: Ralph Spencer Poore; Richard E. Overfield, Jr., both of Arlington, TX (US)

(73) Assignee: Ernst & Young U.S. LLP, New York, NY (US)

( * ) Notice: Subject to any disclaimer, the term of this patent is extended or adjusted under 35 U.S.C. 154(b) by 0 days.

(21) Appl. No.: 09/168,660

(22) Filed: Oct. 8, 1998

Related U.S. Application Data

(60) Provisional application No. 60/075,236, filed on Feb. 19, 1998.

(51) Int. Cl.[7] .................................................. G06K 19/06
(52) U.S. Cl. ........................................... 235/493; 235/375
(58) Field of Search ..................................... 235/493, 380, 235/375, 462.01, 494, 382.01, 382

(56) References Cited

U.S. PATENT DOCUMENTS

| | | | |
|---|---|---|---|
| 4,914,279 | * | 4/1990 | Massey ................................. 235/449 |
| 5,432,329 | | 7/1995 | O'Boyle et al. . |
| 5,613,680 | * | 3/1997 | Groves et al. .................... 273/138.2 |
| 5,661,284 | | 8/1997 | Freeman et al. . |
| 5,696,908 | | 12/1997 | Muehlberger et al. . |
| 5,756,220 | * | 5/1998 | Hoshino et al. .................. 428/537.5 |
| 5,886,334 | * | 3/1999 | D'Entremont et al. ............. 235/380 |
| 5,907,350 | * | 5/1999 | Nemirofsky .......................... 348/13 |

FOREIGN PATENT DOCUMENTS 60-19279 * 1/1985 (JP) ..................................... 235/380

* cited by examiner

Primary Examiner—Thien M. Le
(74) Attorney, Agent, or Firm—Fitch, Even, Tabin & Flannery

(57) ABSTRACT

A transaction card carrying encrypted information for verifying that the card has not been forged comprises a card stock, a magnetic stripe storing account information, a printed or embossed account number and a barcode. It is possible, using conventional point-of-sale terminal equipment and magnetic stripe reading and barcode scanning hardware, to determine whether the account information on the transaction card has been forged. This is done by extracting the account number from the magnetic stripe using a magnetic stripe reader or by entering it manually, decrypting the information stored on the barcode and comparing the decrypted information to a representation of the account number information.

15 Claims, 4 Drawing Sheets

TRANSACTION CARD AND METHODS AND APPARATUS THEREFOR

CROSS-REFERENCE TO RELATED APPLICATION

This application is based on, and claims benefit of, now abandoned United States Provisional Application Serial No. 60/075,236 filed Feb. 19, 1998.

BACKGROUND OF THE INVENTION

The invention relates in general to a transaction card and methods for making and reading and apparatus therefor. In particular the invention relates to a transaction card having encrypted portions thereon to reduce the likelihood that such cards may be produced in bulk as part of a forgery scheme and used to defraud a merchant. The transaction card may be a proprietary credit card or proprietary stored value card as well as other types of card.

One of the problems associated with the issuance of credit cards, debit cards and other transaction cards capable of either holding stored value or being representative of stored value or line of credit is that they are subject to wholesale forgery. A number of attempts have been made to prevent such card forgery. For instance VISA and MasterCard systems use card validation encryption on the magnetic stripe. Unfortunately this has been found to be inadequate. Other schemes have been suggested including the use of paramagnetic strips, fractal encoding and computer holographic representations on the card. All of these have failed for various reasons, in part because many of them require the use of specialized counter-card forgery methods requiring specialized equipment. One of the problems with such equipment is that it must be added to the usual point-of-sale terminal in a retailer's floor operation and the cost of avoiding the losses for forgery tends to escalate due to the capital costs of the addition of such equipment.

What is needed then is a convenient low-cost method of insuring the authenticity of a transaction card in order to avoid accepting a forged card as legitimate and providing goods and services as a result thereof.

SUMMARY OF THE INVENTION

A transaction card and methods and apparatus for producing and carrying on transactions with respect to the card is herein disclosed. The transaction card consists of a card stock having a magnetic stripe formed thereon, the magnetic stripe being able to accept a magnetic pattern indicative of an account number associated with a particular customer who is to be the legitimate holder of the card. The account number may also be printed or embossed on the transaction card to allow the card to be used if the magnetic stripe is unreadable. The account number could be positioned at any convenient location on the card stock. In order to prevent or reduce the likelihood of a merchant or other person accepting a forged card (as opposed to a counterfeit card) as a legitimate card a barcode is provided on the front of the card which includes an encrypted version of at least a portion of the information contained on the magnetic stripe. The barcode, however could be positioned at any convenient location on the card stock. The barcode has formed thereon a barcode pattern which represents the result of an encryption process wherein an account number is operated upon by the secure hash algorithm, SHA-1 to produce a 160-bit message digest. The resulting hash or message digest is truncated to 64 bits in order to be able to include an encrypted version of the message digest on a 24-digit barcode of standard type. A private key is then selected as being associated with a batch number associated with the transaction card and the private key is used as a private key for elliptic curve encryption of the truncated hash. The resulting encrypted truncated hash is then converted from hexadecimal format to decimal format and stored as a barcode on the card. This method is not dependent on the proper functioning of the magnetic stripe, the magnetic stripe reader, nor the barcode scanner. It is not unusual for any of these technologies to fail This method will function as long as the account number and barcode number can be manually entered in the process.

When the transaction card is presented the magnetic stripe is read or manually entered and the barcode is scanned or manually entered and information related both to the batch and account number is extracted therefrom. The batch number is used to select a public key. The public key is used to decrypt the encrypted hash value to provide a plain text or open 64-bit message digest. The account information extracted from the magnetic stripe or manually entered is then processed using the Secure Hash Algorithm and truncated to 64 bits to provide a 64-bit message digest representative of the account number. The message digest resulting from the barcode is then compared to the message digest resulting from the account number and if the two match the point-of-sale equipment continues to process the transaction. If the two do not match, the point-of-sale equipment will halt processing of the transaction due to the account information, whether on the magnetic stripe or on the face of the card itself as embossed or printed characters, likely having been forged.

It is a principal aspect of the present invention to provide a transaction card which provides encrypted security thereon in the form of a separate encryption storage device stored as a barcode. It is another aspect of the present invention to provide a secure transaction card which is difficult to forge but which may easily have its authenticity tested by conventional point-of-sale terminal equipment and magnetic stripe reading and barcode scanning hardware. It is another aspect of the present invention that it is not dependent on proper functioning of the magnetic stripe, magnetic card reader or barcode scanner.

Other aspects of the present invention will become apparent to one of ordinary skill in the art upon a perusal of the specification and claims in light of the accompanying drawings.

DETAILED DESCRIPTION OF THE PREFERRED EMBODIMENT

Figure 1:
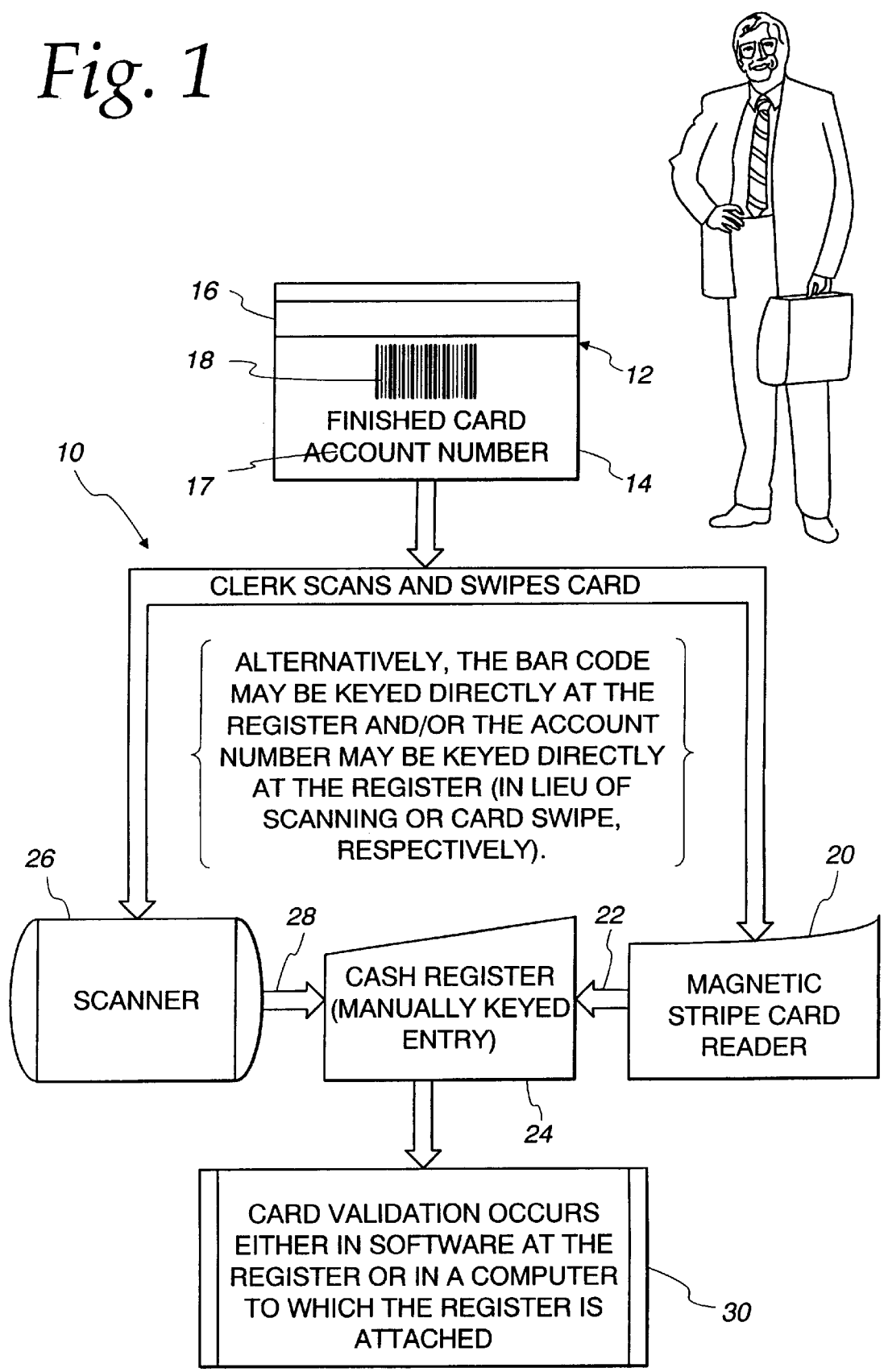
FIG. 1 is a block diagram showing an apparatus for reading and operating a secure transaction card, the apparatus and the card embodying the present invention.

Referring now to the drawings and especially to FIG. 1, apparatus embodying the present invention is shown therein and generally referred to by reference numeral 10. The apparatus 10 acts in conjunction with a secure transaction card 12, which may be a credit card, debit card or the like, and in particular may be a proprietary credit card or a proprietary stored value card. The secure transaction card 12 has a card stock 14 having an encoded magnetic stripe 16 positioned thereon, a printed or embossed account number 17 and an encoded barcode region 18 as well. The magnetic stripe 16 is encoded with account number information. The barcode 18, as will be set forth in greater detail hereafter, includes a four digit plain text batch number field containing the batch number in plain text form and a 16 digit encrypted information which may be decrypted to determine whether the account information either in the magnetic stripe 16 or embossed or printed 17 on the card is legitimate or forged.

The apparatus 10 includes a magnetic stripe reader 20 which, when the magnetic stripe is swiped through it, passes information over a bus 22 to a cash register or a point-of-sale terminal 24. That information relates to the account number. A barcode scanner 26 is associated with the cash register or point-of-sale terminal 24 and captures the barcode 18 and passes a resulting barcode signal over a bus 28 to the point-of-sale terminal 24. The point-of-sale equipment 24 could also accept the direct entry of either or both the account number or barcode. The point-of-sale terminal 24 operates on the barcode and account information as will be seen hereafter and, if there is coherency between the information, issues a validation signal in a step 30.

Figure 2:
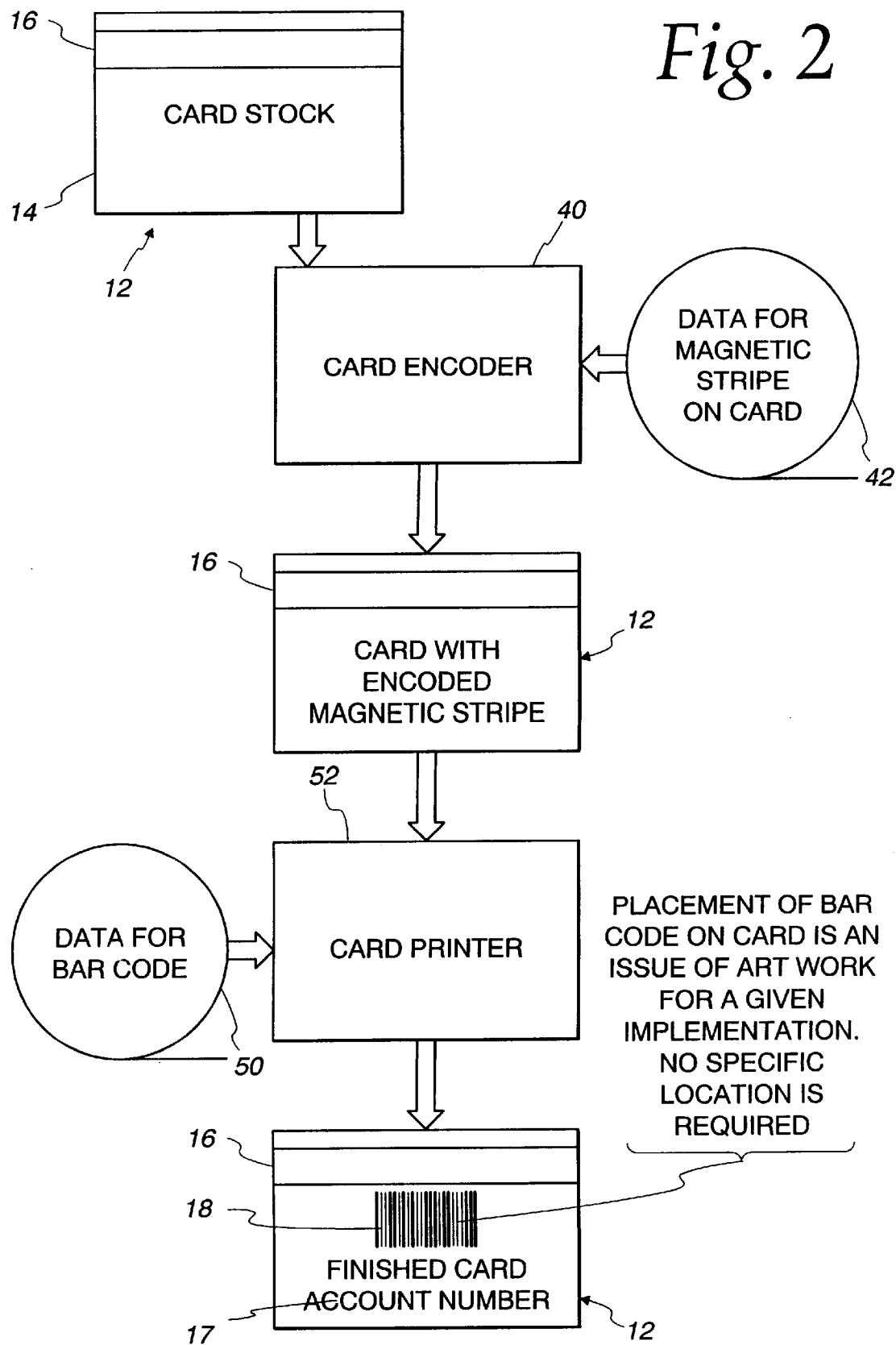
FIG. 2 is a flowchart showing details of the method of producing the secure card.

Referring now to FIG. 2, manufacture of the transaction card 12 begins with the card stock 14 which may include any durable and/or flexible material composed of a polymer or the like having a magnetic stripe 16 formed thereon. The card 12 is fed into a card encoder 40 and the magnetic stripe 16 is encoded thereby with the account number and check value 42. Data for the barcode is received from a source 50, as will be seen hereafter in more detail, and passed to a card printer 52. The card printer 52 then applies the account number 17 and barcode 18 to the card stock 14 so that the account number 17, barcode 18 and the magnetic stripe 16 reflect information to the user of the card. The account number and barcode placement on the card may essentially be arbitrary and is a matter of esthetics. No specific location of the account number 17 or barcode 18 with respect to the magnetic stripe 16 is required.

Figure 3:
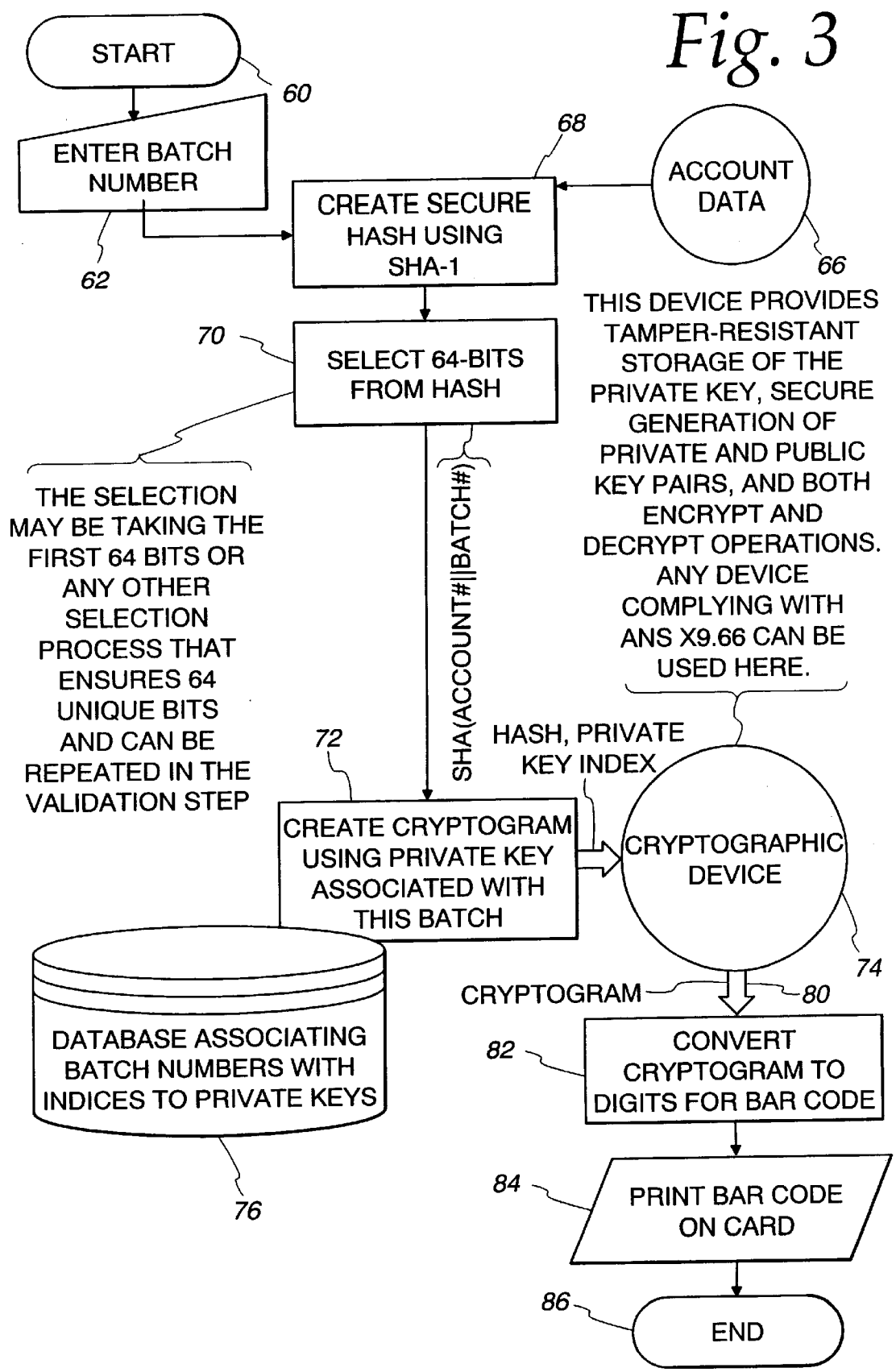
FIG. 3 is a flowchart showing details of the generation of a barcode on the secure transaction card.

In order to prepare the data for the barcode 18 from step 50 a method, as may best be seen in FIG. 3, begins at a step 60. A batch number is entered in a step 62. The batch number identifies a batch of transaction cards 12 which may include credit cards, debit cards and the like. The batch number may be assigned to a very few cards or to very many cards. The range of transaction cards associated with the batch number may extend from hundreds of cards to millions of cards depending on the batch number resolution desired by the card issuer. The number of cards associated with the batch number is not a limitation of the process.

The account data related to the particular user which is to be associated with the batch is supplied in a step 66. The account data typically includes a 16-digit account number having information related to the user, perhaps related to the financial status as well. The account data and the batch number are fed to a secure hash algorithm.

In this embodiment a standard secure hash algorithm known as Secure Hash Algorithm 1 (SHA-1) created under the auspices of the National Institute of Standards and Technology is employed. The SHA-1 algorithm operates according to the SHA-1 standard on the batch number and account data to yield a 160-bit message digest reflective of the batch number and the account data in a step 68. The 160-bit message digest, in SHA-1 format, is truncated in a step 70 to 64 bits. In the preferred embodiment the first 64 bits are taken although other bits may be taken from the 160 of the complete SHA-1 message digest. The truncation is necessary for later recording of information in a standard ENN barcode format able to be read by a barcode scanner for a point-of-sale terminal.

In order to create a cryptogram in a step 72 the truncated SHA-1 or hash bits, having a length of 64, are passed to a cryptographic device 74 together with a private key index which is associated with a database 76 storing batch numbers indexed to private keys. The cryptographic device 74 may be any device complying with the ANS X9.66 standard. The cryptographic device 74 then operates in a well-known fashion, employing an elliptic curve encrypting function to yield a cryptogram 80 which has been encrypted using the private key associated with the batch number.

The cryptogram is then converted from the 64-bit format which comprises sixteen hexadecimal digits to 20 decimal digits in a step 82. The four digit batch number is prepended to the 20 decimal digits and encoded as a barcode. The barcode which is in the ENN standard or the like is then printed on the card in a step 84 and the process ends in step 86.

Figure 4:
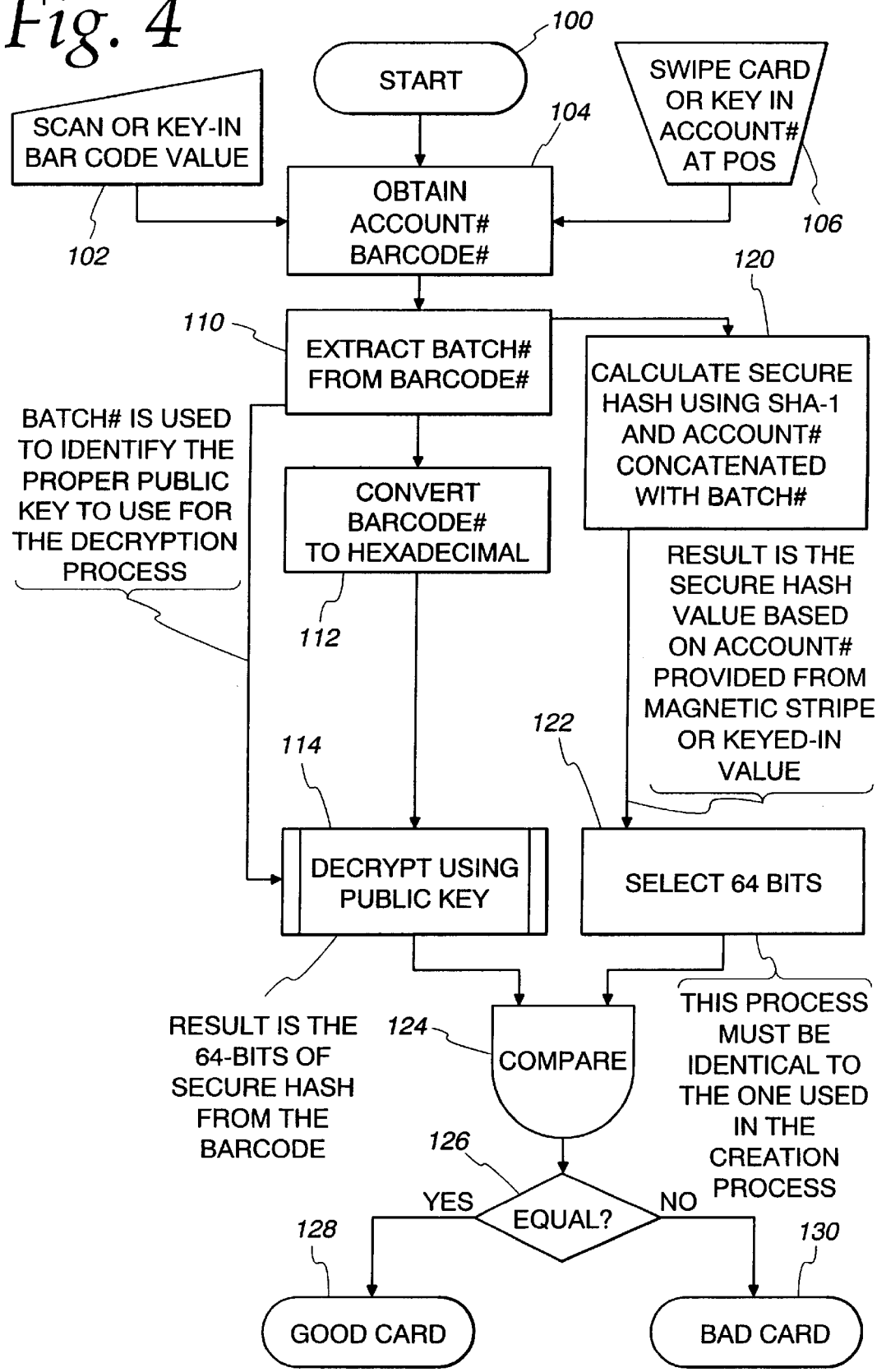
FIG. 4 is a flowchart showing details of the manner in which information obtained from a magnetic stripe on the transaction card and obtained from the barcode is processed in order to determine whether the card is forged or is a legitimate card.

When a customer desires to use the transaction card a card validation process takes place at the merchant. As was set forth above, the card validation step 30 which is performed in FIG. 1 results from inputs having been received from the barcode scanner 26, the magnetic stripe reader 20 and/or cash register 24. Referring also now to FIG. 4, the process is started at a step 100 and the scanner 26 scans in the barcode value or cash register 24 accepts the manual entry of the barcode value in step 102 and transfers the barcode signal to a step 104 wherein the account number and the barcode are obtained the account number having been obtained in a step 106 when the magnetic stripe card reader 20 reads the magnetic stripe 16 of the card 12 or cash register 24 accepts the manual entry of account number 17. The batch number is extracted in a step 110 from the barcode because the barcode occupies 24 digits, the first four digits of which are in a plain text format and are the batch number. The batch number is then used to select a public key associated with the batch number for use in later decryption. In a step 112 the last 20 barcode digits are converted to hexadecimal format and passed to an elliptic curve decryption process of well-known type comprising a step 114. The barcode encrypted information is decrypted using the previously selected public key to yield the original 64 bits of the message digest or hash value in a step 114.

In a step 120 the account number obtained from the magnetic stripe or manual entry is concatenated with the batch number and the secure hash algorithm is used to obtain the SHA-1 160-bit message digest. The SHA-1 message digest is then truncated by selecting the 64 bits from it in a step 122 and the newly created message digest from the account number obtained from the magnetic stripe or manual entry is compared with the decrypted truncated SHA-1 message digest from the barcode in a step 124. If there is a match as tested for in a step 126, a conclusion is reached in a step 128 that the card is in fact not a forgery and is legitimate. If there is no match, the conclusion is reached in a step 130 that the card is illegitimate and the transaction is halted.

While there has been illustrated and described a particular embodiment of the present invention, it will be appreciated that numerous changes and modifications will occur to those skilled in the art, and it is intended in the appended claims to cover all those changes and modifications that fall within the true spirit and scope of the invention.

What is claimed is:

1. A transaction card carrying encrypted information for verification that the card has not been forged, comprising:
   a card stock;
   a magnetic stripe storing account number information and public key referencing information;
   a printed or embossed account number representing the account number information; and
   a barcode representative of a private key encrypted representation of the account number information for an authorized account, whereby the barcode may be read and decrypted using the public key and compared with the account number derived from the magnetic stripe to determine whether the contents of the magnetic stripe has been forged.

2. A transaction card in accordance with claim 1 further comprising a printed or embossed account number.

3. A transaction card in accordance with claim 1 wherein the magnetic stripe includes a magnetic pattern indicative of the account number.

4. A transaction card in accordance with claim 3 wherein the magnetic stripe is encoded with a check value.

5. A transaction card in accordance with claim 1 wherein the barcode includes a plain text batch number field indicative of the public key.

6. A transaction card in accordance with claim 5 wherein the plain text batch number field contains a batch number in plain text form and encrypted information.

7. A method of determining whether account information on a transaction card has been forged comprising:
   presenting a transaction card having a magnetic stripe having account number information and a barcode having private key encrypted account number information thereon to a magnetic stripe reader;
   extracting the account number information from the magnetic stripe;
   decrypting the private key encrypted account number information stored in the barcode; and
   comparing the decrypted account number information to a representation of the account number information to determine whether the account number information is legitimate or forged.

8. A method in accordance with claim 7 further comprising sending a validation signal if the account number information is legitimate to enable a point-of-sale terminal to continue with a transaction.

9. A method in accordance with claim 7 wherein the information stored in the barcode includes a batch number and account data.

10. A method in accordance with claim 9 further comprising first manufacturing the transaction card according to a manufacturing process which includes encrypting the information stored in the barcode by employing a secure hash algorithm.

11. A method in accordance with claim 10 wherein the secure hash algorithm is Secure Hash Algorithm 1.

12. A method in accordance with claim 10 further comprising creating a cryptogram from the encrypted information.

13. A method in accordance with claim 12 further comprising converting the cryptogram to encode the cryptogram as a barcode which is printed on the transaction card.

14. A method in accordance with claim 7 wherein the transaction card also has an account number printed or embossed thereon to allow manual entry of the account number if the account number cannot be extracted from the magnetic stripe.

15. Apparatus for determining whether account information on a transaction card is legitimate or forged, comprising:
   a magnetic stripe reader for generating a magnetic stripe signal indicative of account information and public key referencing information derived from a magnetic stripe of the transaction card;
   a barcode reader for developing a barcode signal indicative of private key encrypted account number information stored on a barcode on the transaction card;
   a decrypter using a public key referenced by the public key referencing information for decrypting the private key encrypted information to yield a decrypted barcode value; and
   a comparator for comparing a representation of the account number derived from the magnetic stripe or printed or embossed on the transaction card with the decrypted barcode value to determine whether the account number is legitimate or forged.

* * * * *